(12) United States Patent
Bevans et al.

(10) Patent No.: US 8,623,110 B2
(45) Date of Patent: Jan. 7, 2014

(54) PROTEIN AND ISOLATED OR PURIFIED AMINO ACID PRODUCT CONTAINING COMPOSITIONS AND USES THEREOF

(75) Inventors: Basil Bevans, Quincy, IL (US); David Holzgraefe, Quincy, IL (US); Dan S. Hickman, Payson, IL (US); Kimberly C. Hickman, legal representative, Payson, IL (US)

(73) Assignee: Archer Daniels Midland Company, Decatur, IL (US)

( * ) Notice: Subject to any disclaimer, the term of this patent is extended or adjusted under 35 U.S.C. 154(b) by 649 days.

(21) Appl. No.: 12/185,199

(22) Filed: Aug. 4, 2008

(65) Prior Publication Data
US 2009/0031775 A1 Feb. 5, 2009

Related U.S. Application Data

(60) Provisional application No. 60/953,569, filed on Aug. 2, 2007, provisional application No. 60/969,783, filed on Sep. 4, 2008.

(51) Int. Cl.
*C05F 15/00* (2006.01)
*C05F 1/00* (2006.01)
*C05F 3/00* (2006.01)
*C05F 11/02* (2006.01)
*C05G 3/04* (2006.01)

(52) U.S. Cl.
USPC .............. 71/15; 71/17; 71/18; 71/19; 71/20; 71/21; 71/22; 71/23; 71/24; 71/903; 504/189

(58) Field of Classification Search
USPC ............... 71/11–30, 903; 426/656; 562/562; 504/189
See application file for complete search history.

(56) References Cited

U.S. PATENT DOCUMENTS

| | | | |
|---|---|---|---|
| 4,491,464 A * | 1/1985 | Ashmead et al. | ................. 71/11 |
| 5,871,802 A | 2/1999 | Gao et al. | |
| 5,888,500 A | 3/1999 | Marshall | |
| 5,935,626 A | 8/1999 | Moechnig et al. | |
| 5,997,939 A | 12/1999 | Moechnig et al. | |
| 6,080,221 A | 6/2000 | Moore | |
| 6,113,974 A | 9/2000 | Winowiski et al. | |
| 6,238,727 B1 | 5/2001 | Takemoto et al. | |
| 6,325,934 B1 | 12/2001 | Tobey, Jr. et al. | |
| 6,874,277 B2 * | 4/2005 | Yamashita | ............... 47/58.1 SC |
| 6,953,593 B2 | 10/2005 | Kuhrts | |

(Continued)

FOREIGN PATENT DOCUMENTS

| | | |
|---|---|---|
| EP | 0940088 A2 | 9/1999 |
| GB | 21646401 A | 3/1986 |

(Continued)

OTHER PUBLICATIONS

"http://www.bonnieplants.com/DesktopModules/DnnForge%20-%20NewsArticles/Print.aspx?tabid=79&tabmoduleid=72&articleId=238&moduleId=415&PortalID=0,"unknown date, p. 1-3.*

(Continued)

*Primary Examiner* — Wayne Langel
*Assistant Examiner* — Syed Iqbal
(74) *Attorney, Agent, or Firm* — Andrew F. Nilles (57) ABSTRACT

Compositions comprising a protein and an isolated or purified amino acid product, and uses thereof are disclosed.

15 Claims, 6 Drawing Sheets

(56) References Cited

U.S. PATENT DOCUMENTS

| | | | |
|---|---|---|---|
| 2002/0121046 A1* | 9/2002 | Yamashita | 47/58.1 SC |
| 2003/0172698 A1* | 9/2003 | Koda et al. | 71/25 |
| 2004/0256315 A1 | 12/2004 | Boyd et al. | |
| 2006/0067984 A1 | 3/2006 | Cavassini et al. | |
| 2007/0131010 A1* | 6/2007 | Binder et al. | 71/23 |

FOREIGN PATENT DOCUMENTS

| | | | |
|---|---|---|---|
| JP | 2000281575 A1 | | 10/2000 |
| JP | 2006193368 A1 | | 7/2006 |
| WO | WO 2004080196 A2 | * | 9/2004 |
| WO | 2006032958 A2 | | 3/2006 |

OTHER PUBLICATIONS

ADE Mineral w/CTC, Kent Feeds, Inc. 2000, pp. 10A-10B, USA.

Goat Mineral, Kent Feeds Inc., 2004, pp. 42A, USA.

OptiCor Optimizednutrition Core protection, ADM Alliance Nutrition Beef, ADM Alliance Nutrition, Oct. 30, 2006, pp. 1-3, http://www.admani.com/alliancebeef/Opticor.htm.

Notification Concerning Transmittal of International Preliminary Report on Patentability for International Application No. PCT/US2007/023764 (acting as International Searching Authority), 2 pages, May 29, 2008.

Written Opinion of the International Searching Authority for International Application No. PCT/US2007/023764. European Patent Office (acting as International Searching Authority), 9 pages, May 29, 2008.

Declaration of Non-Establishment of ISR, Application No. PCT/US2008/009367, European Patent Office (acting as International Searching Authority), 2 pgs., Feb. 26, 2009.

Written Opinion of the International Searching Authority for International Application No. PCT/US2008/009367, European Patent Office (acting as International Searching Authority), 4 pgs., Feb. 26, 2009.

* cited by examiner

PROTEIN AND ISOLATED OR PURIFIED AMINO ACID PRODUCT CONTAINING COMPOSITIONS AND USES THEREOF

CROSS-REFERENCE TO RELATED APPLICATIONS

This application claims the benefit of U.S. Provisional Application No. 60/953,569, filed Aug. 2, 2007, and U.S. Provisional Application No. 60/969,783, filed Sep. 4, 2007, each of the contents of the entirety of which are incorporated by this reference

TECHNICAL FIELD

Various non-limiting embodiments of the present disclosure are directed toward compositions which may be used as soil conditioners and/or fertilizers. Other non-limiting embodiments are directed toward compositions that add nutrients to soil. Also disclosed are methods for increasing nitrogen and/or mineral content in soil, improving turfgrass quality, increasing soil microbial content, and/or fertilizing horticultural or agricultural crops using the various compositions.

SUMMARY OF THE INVENTION

In one embodiment, a composition comprises a seed protein, an isolated or purified amino acid product and a binding agent.

In another embodiment, a composition comprises soybean meal, an isolated or purified lysine product, soy protein isolate, and soybean oil.

In yet a further embodiment, a method comprises applying a composition of the present invention to a plant, soil or a combination thereof.

In an additional embodiment, uses of the compositions of the present as a fertilizer or soil amendment are disclosed.

In an yet additional embodiment, methods of controlling lawn dollar spots or lawn crabgrass are disclosed.

Other embodiments also describe compositions and methods of improving turfgrass quality, reducing the presence of weeds and increasing clippings weight.

DETAILED DESCRIPTION

According to one non-limiting aspect of the present invention, a composition comprises a plant, vegetable or seed protein material; a vegetable oil; a plant, vegetable or seed processing byproduct; an amino acid; a fermentation cell broth; an ammonium salt of an organic acid; an amidated organic carboxylic acid; a soluble plant protein; a chelated mineral; and mixtures of any thereof. In certain embodiments, the seed protein product may be one or more of the components selected from the group consisting of high protein soybean meal, soy protein isolate, soybean oil, soybean flakes, soybean hulls, soybean flour, soybean grits, soybean flakes, whey protein, canola protein, milk protein, egg protein, gelatin, wheat gluten, wheat protein isolate, wheat protein concentrate, cottonseed protein, palm kernels, palm protein, rapeseed kernels, safflower protein, sunflower protein, sesame protein, peanut protein, peanut processing residue, and mixtures of any thereof.

In certain other embodiments, a binding agent may comprise a vegetable oil selected from the group consisting of butterfat, cocoa butter, cocoa butter substitutes, illipe fat, kokum butter, milk fat, mowrah fat, phulwara butter, sal fat, shea fat, camelina oil, canola oil, castor oil, coconut oil, coriander oil, corn oil, cottonseed oil, hazelnut oil, hempseed oil, jatropha oil, linseed oil, mango kernel oil, meadowfoam oil, mustard oil, neat's foot oil, olive oil, palm oil, palm kernel oil, peanut oil, rapeseed oil, rice bran oil, safflower oil, sasanqua oil, shea butter, soybean oil, sunflower seed oil, tall oil, tsubaki oil, tung oil, vegetable oils, triacylglycerols, diacylglycerols, monoacylglycerols, triolein, palm olein, palm stearin, palm kernel olein, palm kernel stearin, triglycerides of medium chain fatty acids, and derivatives, conjugated derivatives, genetically-modified derivatives, and mixtures of any thereof.

In another embodiment the vegetable oils used may be crude, refined or partially refined. In another embodiment the vegetable oils may be modified, either chemically or enzymatically.

In yet another embodiment the vegetable oils may be a mixture of monoglycerides, diglycerides and triglycerides. In other embodiments the vegetable oils may be deodorized and/or bleached.

In yet another embodiment, a binding agent used in the compositions of the present invention may include crude glycerin, corn syrup, corn steep liquor, condensed distillers' solubles or any combinations thereof.

In yet a further embodiment, the binding agent may be lecithin. The lecithin may be modified, un-modified or crude and may be obtained from any number of sources including, but not limited to, soy, corn or canola.

In certain yet other embodiments, the isolated or purified amino acid product may be selected from the group consisting of lysine monohydrochloride, lysine hydrate, lysine dihydrochloride, lysine sulfate, lysine free-base, lysine cell waste, lysine cell mass, lysine raffinate, a lysine mother liquor, threonine, threonine cell mass, threonine mother liquor, methionine, tryptophan, glucosamine and mixtures of any thereof.

Another embodiment may include a composition comprising high protein soybean meal, lysine HCl, soy protein isolate, soy protein concentrate and soybean oil. In certain other embodiments, the soybean meal may be between 50-80 percent by weight of the composition, the lysine HCl may be between 10-30 percent by weight of the composition, the soy protein isolate may be between 5-10 percent by weight of the composition, the soy protein concentrate may be between 1-20 percent by weight of the composition and the soybean oil may be between 1-5 percent by weight of the composition.

Other aspects of the present invention include a method comprising applying a composition comprising a seed protein product, an amino acid and a binding agent to a turfgrass at a rate of at least 0.1 pounds of nitrogen per one thousand square feet of the turfgrass. In certain embodiments, the seed protein is a soybean meal product having a nitrogen content of at least 25%.

Further non-limiting embodiments include a method of improving turfgrass quality. The method comprises applying a composition, as described herein, to turfgrass. Further non-limiting embodiments include a method of improving soil microbial content comprising applying a composition of the present invention to soil.

Another non-limiting embodiment describes a soil conditioner composition comprising a fertilizer composition and an organic material.

In another non-limiting embodiment, a composition of the present invention comprises a high protein soybean meal, a dry lysine product, a liquid lysine product, a lysine fermentation by-product, a threonine fermentation by-product, a low protein soybean meal, soybean oil, and combinations of any thereof. In another non-limiting embodiment, a fertilizer or soil conditioner composition comprises a high protein soybean meal, lysine hydrochloride, soy protein isolate, soy protein concentrate, soybean oil, and combinations of any thereof.

In certain other embodiments, upon application of the organic compound to a turf grass prior to winter dormancy, a color of the turf grass may be improved as compared to the turf grass without having the organic compound applied.

Still further non-limiting embodiments include methods of fertilizing horticultural or agricultural crops. The methods include applying a composition of the present invention to the horticultural or agricultural crop, such that the composition promotes growth and/or production of the horticultural or agricultural crop.

The various non-limiting embodiments of compositions of the present may be used as granular soil conditioners, granular fertilizer compositions and used in various methods of increasing the nitrogen content of soil, promoting crop production, and fertilizing horticultural and agricultural crops, including, for example, turfgrass.

Application of nutrient soil conditioners to soil in which commercial crops, such as, for example, fruits, vegetables, grains, grasses, for example turf grasses, and other horticultural and agricultural products, are planted is one approach for increasing production and growth of such crops or grasses.

Turfgrass may be defined as a grass cover established on a site for various uses including, but limited to, preventing erosion and maintaining visibility (e.g. a road side); to reduce dust, glare, and surface temperatures (e.g. a lawn or a park); to beautify the surroundings (e.g. a lawn); and to provide a playing surface for sports and recreating (e.g. athletic fields and golf courses).

The grass family (Gramineae) includes over 500 species of plants, but about 40 species are suited for turf use. These include without limitation the genus Bermuda grass (*Cynodon* spp.) with the species *C. dactylon* [L.] Pers. being the most widespread. Other grasses common in the United States include, but are not limited to, Saint Augustine grass (*Stenotaphrum secundatum*), Tall fescue (*Festuca* spp.), Bent grass (*Agrostis*), Buffalograss (*Buchloe dactyloides*), Kentucky bluegrass (*Poa pratensis*), and Ryegrass (*Lolium* spp.). Details on various varieties of turf grasses and their use are described in "Turf grasses—Their Management and Use in the Southern Zone" by Richard L. Duble (Texas A&M University Press, $2^{nd}$ Ed. 2001), the contents of the entirety of which are incorporated herein by reference.

Turfgrass growth and maintenance requires optimization of water, nutrients and herbicides. Soil nutrients, such as, nitrogen, phosphorus, potassium, and sulfur, as well as trace elements such as iron, zinc, copper, and magnesium, are useful for achieving thriving agriculture and growth of the plants. However, upon repeated planting cycles, the quantity of these nutrients in the soil may be depleted as plants utilize the nutrients. Depletion of nutrient levels in the soil may result in inhibited plant growth and decreased production per acre. To counter this effect, soil conditioners and fertilizers have been developed to help replace the depleted vital nutrients in soil so that optimal plant growth and high yields may be obtained.

Soil conditioners may be classified as either organic soil conditioners or inorganic soil conditioners. As used herein, the term "organic" includes having a molecular skeleton comprising a carbon backbone. Organic soil conditioners are made from materials derived from living things. Examples of organic fertilizers include, but are not limited to, vegetable, plant or seed proteins, animal manures, compost, bone meal, feather meal, peat, blood meal and combinations of any thereof. Inorganic soil conditioners, on the other hand, are manufactured from non-living materials and include, for example, ammonium nitrate, ammonium sulfate, urea, potassium chloride, potash, ammonium phosphate, anhydrous ammonia, other phosphate salts and combinations of any thereof.

Inorganic soil conditioners are commercially available and contain nutrients in soluble form that are immediately available to the plant. Inorganic soil conditioners are generally inexpensive, having a low unit cost for the desired element. In addition, the exact amount of a given element may be calculated and administered to the plant or soil.

However, some inorganic soil conditioners may suffer from disadvantages. First, inorganic soil conditioners, especially nitrogen soil conditioners, may be subject to leaching to levels below the root of the plant. This leaching may occur as a result of rain or irrigation, and may result in contamination of ground water, community drinking water, and/or wells by soil conditioner components. Such leaching may render the nutrients unavailable to the plant's roots and result in wasted money being spent on the leached soil conditioners. Second, excess application of the inorganic soil conditioner may result in phytotoxicity, such as, burning of the plant tissue (foliar burn) and roots, particularly with young plants. Finally, inorganic soil conditioners may lead to build up of toxic concentrations of salts in the soil due to heavy or non-systematic application of the soil conditioner. Alternatively, chemical imbalances may develop if soil nutrient content is not closely monitored.

Organic soil conditioners, on the other hand, are typically not as immediately available to plants and may require soil microorganisms to break the organic soil conditioner components down into simpler structures prior to use by the plants. This break-down occurs over a time period and may provide for slower release of nutrients. Organic soil conditioners usually have a low salt index, so larger amounts may be applied at one time without causing injury to the plant. In addition, buildup of toxicity in the soil is unlikely. However, the cost of organic soil conditioners on a unit cost of nutrients basis is typically higher than the inorganic counterparts and may make the commercial application of conventional organic soil conditioners cost prohibitive.

In addition, organic soil conditioners may not only elicit a plant growth response as observed with common inorganic soil conditioners, but natural organic soil conditioners may also stimulate soil microbial population growth and activities. Increased soil microbial population may have significant beneficial effects on the physical and chemical properties of the soil, as well as increasing disease and pest resistance.

In another embodiment, an organic soil conditioner that may be used to stimulate the soil microbial populate includes, but is not limited to, a fermentation co-product such as citric acid yeast cream (e.g., CITRISTIM brand yeast cream available from Archer Daniels Midland Company, Decatur, Ill.), an ethanol yeast biomass obtained from the production of ethanol or other ethanol fermentation by-products, amino acid fermentation mother liquors and combinations of any thereof. Such organic soil conditioners may be present in a composition as described herein in a concentration of between 0.1-5% by weight of the composition.

There is, therefore, a need for soil conditioners or fertilizers that do not exhibit the disadvantages of known inorganic soil conditioners or fertilizers, but include many or all of the advantages exhibited by these products.

According to the various embodiments, the compositions of the present disclosure may be applied to soil, agricultural or horticultural crops in an amount that replenishes various nutrients that may have been depleted from the soil such as, for example, as a result of repeated planting cycles or that may have been depleted by leaching. Alternatively, the compositions may be applied to soils having low or insufficient nutrient levels and/or soil microbe levels to support efficient agricultural production of crops, such as, for example, land that is currently unsuitable for farming or crop production.

In other non-limiting embodiments, the compositions of the present disclosure may promote growth of a plant in a hydroponic or aeroponic system.

In other non-limiting embodiments, the compositions described herein may be granular free flowing powders.

According to certain non-limiting embodiments of the present disclosure, the one or more organic compounds of the compositions may comprise a plant or vegetable protein, such as a seed protein intermixed with an amino acid and binding agent. The proteins which can be used in accordance with the present disclosure may be vegetable proteins which are insoluble at their isoelectric points and soluble above and below their isoelectric points. Vegetable proteins that may be used are those described as oil seed proteins which are generally derived from oil seed cake, i.e., that material left after expression of oil from such seeds as cottonseed, palm, peanut, rape, safflower, sesame, soybean, sunflower and the like. Extractable protein from other vegetable sources such as peas (chick, field, lentil, broad, wrinkled, white and the like), edible beans (mung, winged, caster, faba, lima, pinto, kidney and the like), grains (wheat, rye, rice, corn and the like), stringbeans and leaves (alfalfa, clover, legumes, vegetables and the like) can also be used.

In various embodiments, the proteins that may be used may have a protein content of at least 60%, at least 70% protein, or at least 90% protein. For example, in one embodiment, soy protein concentrate (at least 70% protein-N×6.25 on a moisture free basis) may be used. In another embodiment, soy protein isolate with a minimum protein content of 90% on a moisture-free basis may be used. Soy protein concentrates are available in different forms including, but not limited to granules, flour and spray dried. In another embodiment, soy flour in a powder form may be used as the protein source.

According to certain non-limiting embodiments of the present disclosure, the fertilizer composition may comprise a lysine product, a fermentation cell broth, vegetable oil, products and/or by-products generated at an agricultural product processing facility, and a protein, such as a plant derived protein, a bacterial or microbe derived protein, or an animal derived protein, or mixtures of any thereof. According to certain non-limiting embodiments, the protein may be substantially soluble in an aqueous solution. According to other non-limiting embodiments, the protein may be substantially insoluble in an aqueous solution.

In one embodiment, the compositions of the present invention may be prepared by dry blending the ingredients as described in the various embodiments herein. In one embodiment, the blending may be achieved by a dry blender, ribbon blender, mixer, stirrer, paddle blender, vacuum horizontal blender, extruder, vertical blender and the like. Such apparatuses are known to those skilled in the art and may be used under conditions that provide the optimum mixing of the ingredients and desired particle size and flowability.

According to certain non-limiting embodiments, the compositions of the present disclosure may have a solid granular or agglomerated formulation. According to certain non-limiting embodiments, the granular or agglomerated formulation may have a mesh size of at least 5 (i.e., the particles would have a size of about 4 mm or smaller). According to other non-limiting embodiments, the mesh size may be from about 10 mesh to about 5 mesh (i.e., the particle size would range from about 2 mm to about 4 mm). Pellet size may be coarse (over 200 size guide number (SGN)) by certain industry standards, but smaller pellet size may equate to a larger surface area which may allow for more extensive and rapid soil microbial activities and release of nutrients. According to various embodiments where the composition of the present invention has a solid formulation, the composition may be at least substantially soluble in water at a temperature from 32° F. to 140° F.

According to certain non-limiting embodiments, the composition of the present disclosure may comprise one or more organic compounds comprising one or more isolated or purified lysine products. As used herein, the term "lysine product" includes a product comprising the amino acid lysine ($C_6H_{14}N_2O_2$) and salts or derivatives thereof, and the term "lysine" includes all isomers of lysine (i.e., L-lysine, D-lysine, and any mixture of L- and D-lysine). Lysine has a C to N ratio of 3:1. The lysine products according to various non-limiting embodiments may comprise nitrogen content ranging from about 9% N to about 20% N, depending of the formulation. In certain embodiments, the nitrogen content of the lysine products may range from about 9% N to about 15% N.

Various non-limiting examples of lysine products suitable for use in the present disclosure include, but are not limited to, water soluble salts of lysine, such as, for example, lysine monohydrochloride ("lysine (HCl)"), lysine hydrate, lysine dihydrochloride, and lysine sulfate; lysine free-base; aqueous solutions of lysine free-base; granular lysine; lysine cell waste; lysine cell mass; lysine raffinate; a lysine mother liquor, or mixtures of any thereof.

In certain other embodiments, the compositions may be applied to the soil in an amount of about 1.0 kg/acre to about 4000 kg/acre.

Lysine monohydrochloride (HCl) is commercially available in the form of L-lysine (HCl) (commercially available from Archer-Daniels-Midland Company, Decatur, Ill.). L-lysine (HCl) may be obtained from, for example, but not limited to, purifying the product of a lysine fermentation process by crystallization of the hydrochloride salt. L-lysine monohydrochloride (available from Archer-Daniels-Midland Company, Decatur, Ill., as well as other suppliers) may be utilized either as a granular solid or as an aqueous solution. L-lysine (HCl) has a purity of at least 98.5% (ranging from 95-99%), a crude protein content of about 94.4% (ranging from 90-98%, as measured by a nitrogen content times 6.25), a chloride content of about 19.7% (ranging from 18-22%), and an L-lysine content of about 78.8% (ranging from about 72-85%) with about 100% isomeric purity. Commercial L-Lysine (HCl) may come in the form of tan colored granules having a particle size of <1.19 mm (85%) and <0.17 mm (5%). L-Lysine (HCl) has a solubility in $H_2O$ at 25° C. ranging from 500 g/L to 600 g/L. and has a bulk density ranging from 0.61 $g/cm^3$ to 0.71 $g/cm^3$. The L-lysine (HCl) may be feed grade, commercial grade, or any other suitable grade. L-lysine (HCl) has a nitrogen content of approximately 15% and is readily available at a low unit cost of nitrogen.

It is also contemplated that other isolated or purified amino acids may be suitable for use as or to be used in combination with the one or more organic compounds in the present disclosure. For example, the non-limiting embodiments of the present disclosure may include a composition comprising an amino acid product selected from the group consisting of an arginine product, a methionine product, a threonine product, and combinations of any thereof. The amino acid products may include water soluble salts of the amino acid, free-bases of the amino acids, aqueous solutions of the amino acid salt and/or free-base, and combinations of any thereof. Fertilizer compositions comprising other naturally occurring amino acids are also contemplated.

In another embodiment, a stream of an agricultural process may be used by itself or in conjunction with an amino acid product to produce a fertilizer composition. In one example, an aqueous stream may be subjected to a pH adjustment to precipitate various constituents of the aqueous stream, and the precipitated products may be separated from the remaining aqueous portions. The remaining aqueous portions may be dried and used as the fertilizer composition or combined with the amino acid product.

In one embodiment, a stream of a corn wet mill may have the pH raised by adding $NH_3$ such that phytic acid and phosphorus are precipitated. The remaining aqueous solution may be dried and used as a fertilizer composition or mixed with the amino acid product to be used as the fertilizer composition. In one example, the dried stream may have the following profile, on a dry weight basis: about 50.39% protein (ranging from 40-60%); about 3.61% fatty acids (ranging from 2.5-5.0%); about 33.11% ash (ranging from 25-40%); about 0.18% calcium (ranging from 0.1-0.25%); about 8.97% phosphorus (ranging from 8-10%); about 4.65% magnesium (ranging from 3.5-5.5%); about 2.89% potassium (ranging from 2-4%); less than about 0.01% sodium; about 581.40 PPM iron (ranging from 450-700 PPM); about 880.40 PPM zinc (ranging from 750-1000 PPM); about 37.0 PPM copper (ranging from about 30-45 PPM); about 210.40 PPM manganese (ranging from about 150-260 PPM); and about 0.742% sulfur (ranging from about 0.5-1.0%).

Other embodiments may include prevention and treatment of diseases comply present in lawn or turf grasses. Home lawns are commonly infected by leaf diseases including dollar spot, rust, gray leaf spot, powdery mildew, anthracnose and Helmintho-sporium leaf spot. Most of the time these problems go unnoticed by the homeowner and do not cause significant damage to the lawn. However, when conditions are favorable for disease development, serious damage can occur. Effective control programs for most diseases must include proper cultural care of the lawn, and a basic understanding of the factors affecting disease development. Dollar spot is caused by the fungus, *Sclerotinia homoeocarpa*. It causes straw-colored spots about the size of a silver dollar (2 to 6 inches diameter) to appear on closely mowed turf. Grass in affected areas may die and the spots may merge to form larger, irregular patches. In coarse textured grass that is cut high, the dead spots are larger and more diffuse. Leaf blades have light tan spots with reddish-brown margins that develop across the leaves.

Dollar spot most commonly occurs on bermudagrass, zoysiagrass, bentgrass, fescue and ryegrass. Dollar spot is most active from late spring through fall. The fungus develops during humid weather, when daytime temperatures are warm (59 to 86° F.) and nights are fairly cool. These conditions result in heavy dew forming on the grass. One of the embodiments of the present disclosure is a method for controlling leaf diseases such as dollar spot.

Also a persistent problems in lawns and greens are lawn weeds, such as crabgrass (*Digitaria* spp), which is a warm-season annual weed. The most prevalent species of *Digitaria* in North America are Large Crabgrass (*D. sanguinalis*), sometimes know as Hairy Crabgrass; and Smooth Crabgrass (*D. ischaemum*). These species often become problem weeds in lawns and gardens, growing especially well in lawns that are watered lightly, underfertilized, poorly drained, and growing thinly.

Another embodiment of the present disclosure if a method of controlling lawn weeds such as crabgrass.

In yet another embodiment, the compositions, as described herein, may be applied to the soil and/or plant in a solid, granular, or powdered form, and may be followed by watering (i.e., by irrigation, rain fall, etc.) to disperse the components of the composition into the soil for microbial breakdown. According to other non-limiting embodiments, the compositions disclosed herein may be applied to a plant, such as turf grass, or soil containing such a plant in an amount measured by the weight of nitrogen (as calculated by the N component from the N—P—K value) per unit area per unit time. For example, according to one non-limiting embodiment, the compositions may be applied in an amount from 0.0625 lb nitrogen/1000 $ft^2$/2 weeks to 0.375 lb nitrogen/1000 $ft^2$/2 weeks. According to another non-limiting embodiment, the composition may be applied in an amount from 0.25 lb nitrogen/1000 $ft^2$/month to 3.0 lb nitrogen/1000 $ft^2$/month. According to still other non-limiting embodiments, the compositions may be applied in an amount from 0.5 lb nitrogen/ 1000 $ft^2$/month to 8.0 lb nitrogen/1000 $ft^2$/month.

In other embodiments the N—P—K may be between 9-1-1 and 9-1-3 (i.e. 9 parts nitrogen, 1 part phosphorous (i.e., P2O5) and 1 part potassium (i.e., K2O)). In some yet other embodiments the N—P—K may be between 9-2-1 and 9-2-3. In some other additional embodiments the N—P—K may be between 9-3-1 and 9-3-3.

In yet other non-limiting embodiments, the compositions may be in granular form having a release of water-soluble fertilizer agents such as nitrogen, phosphorous, and potassium compounds. In certain other embodiments the compositions of the present invention may contain trace elements including, but not limited to, manganese oxide, iron sulfate, potassium phosphate and combinations of any thereof.

According to certain non-limiting embodiments, the compositions of the present disclosure may comprise one or more organic compounds comprising a fermentation cell broth, products from a fermentation process, and/or by-products from a downstream recovery process of a fermentation process. As used herein, the term "fermentation cell broth" includes products generated from a fermentation process including, but not limited to, an alcohol, such as, for example, ethanol; an organic acid, such as, for example, lactic acid; an ester of an organic acid, such as, for example, lactate esters; an amino acid, such as lysine or threonine; a fungal, or a bacterial fermentation. The broth may comprise the mycelium, the cell mass, or the biomass of yeast or fungal fermentation and the media on or in which it was grown and may comprise the enzyme system of the viable organism and its concomitant metabolites and other products produced during the fermentation process and not removed during one or more separation processes. The broth may further or alternatively comprise a bacterial fermentation mass, such as, for example, a cell mass or a biomass, and the media on or in which it was grown and may comprise the enzyme system of the viable organism and its concomitant metabolites produced during the fermentation process and not removed during the one or more separation processes.

According to one non-limiting embodiment, the fermentation cell broth may be an alcohol fermentation broth, such as an ethanol fermentation broth utilizing yeast as the fermentation medium. Suitable alcohol fermentation yeast varieties include, but are not limited to, brewer's yeast, baker's yeast and other strains of *Saccharomyces*, such as, *Saccharomyces cerevisiae*.

In yet an additional non-limiting embodiment, the compositions of the present invention may be produced at a first geographic location and transported or shipped to a second geographic location. For instance, a facility at the first geographic location may be able to produce a product more economically than a facility at the second location due to various factors. The factors may include, for example, lower costs of materials, lower costs of energy (e.g., electricity and/or natural gas or other petroleum products), lower costs of labor (e.g., wages paid to employees), lower costs of environmental controls or effects. Thus, the costs of producing the compositions in the first geographic location may be less than the costs of producing the products in the second geographic location, resulting in the production costs being less in the first geographic location.

In such an instance, the composition may be produced at the first geographic location and shipped to the second geographic location such as by transport over water with ships or barges, trucking, flying, by rail, or other means of transportation. The geographic location may be a county, a state, a country, a continent, and/or combinations of any thereof. In this manner the product may be produced, for example, in a first county, state, country, or continent, and transported to and/or sold in a second county, state, country, or continent. Various embodiments of compositions according to the present disclosure will be exemplified in the following examples. Those having ordinary skill in the relevant art will appreciate that various changes in the components, compositions, details, materials, and process parameters of the examples that are hereafter described and illustrated in order to explain the nature of the invention may be made by those skilled in the art, and all such modifications will remain within the principle and scope of the invention as expressed herein and in the appended claims. It will also be appreciated by those of ordinary skill in the art that changes could be made to the embodiments described above and below without departing from the broad inventive concept thereof. It is understood therefore, that this invention is not limited to the particular embodiments disclosed, but is intended to cover modifications that are within the principle and scope of the invention, as defined by the claims.

EXAMPLES

Fertilizer used in the examples were Lysine HCl (LSG, available from Archer Daniels Midland Company Decatur, Ill.), Liquid Lysine (LSL, available from Archer Daniels Midland Decatur, Ill.), Ammonium Sulfate (available locally from a gardening store), Sustane 5-2-4 (available from Sustāne/Natural Fertilizer of America, Canon Falls, Minn.), Nature Safe (available from Griffin Industries, Cold Spring, Ky.), Chipco Ronstar G (available from Bayer Environmental Science, Research Triangle Park, N.C.) Soy-Lysine granular product prepared according to the various embodiments of this disclosure.

Example 1

A fertilizer composition was prepared by blending high protein soybean meal (available from Archer Daniels Midland Company, Decatur Ill.) in an amount 70 percent by weight, lysine HCl (available from Archer Daniels Midland Company, Decatur Ill.) in an amount 20 percent by weight, soy protein isolate (available from Archer Daniels Midland Company, Decatur Ill.) in an amount 7 percent by weight and soybean oil (available from Archer Daniels Midland Company, Decatur Ill.) in an amount 3 percent by weight.

The ingredients were blended in a 3 ton single-ribbon Hays & Stolz mixer (available from Hayes & Stolz Industrial Mfg. Co., Ltd, Forthworth Tex.). The dry ingredients were introduced into the mixer through the dry weigh-up system and the soybean oil was sprayed along the mass of the dry material. The mixture was allowed to blend for at least three minutes. The dry blended product was pelleted in a 150 HP California Pellet Mill (available from California Pellet Mill Co. Crawfordsville Ind.) using steam addition to achieve a temperature of at least 150 degrees Fahrenheit.

The pellet material was crumbled in a pellet crumbler (available from California Pellet Mill Co. Crawfordsville Ind.) to generate a crumbled product, and screened using standard US sieves to meet a desired particle size for the desired application which in one embodiment may be between 3360 microns and 1680 microns. The final granular product has an N—P—K (nitrogen to phosphorous to potassium) ratio of 9:1:2.

Example 2

A turfgrass is fertilized at monthly rates of between about 0.5 and 3.0 lbs nitrogen/1000 square feet with a fertilizer composition of the present invention applied as a solid granular product.

Example 3

A turfgrass is grown and maintained in golf course fairway conditions. The turfgrass is mown at a ½ inch height of cut and fertilized monthly between 0.5 and 3.0 lbs nitrogen per 1000 square feet using a fertilizer composition of the present invention as a solid granular product.

Example 4

A turfgrass is grown and maintained in golf course fairway conditions. The turfgrass is mown at a ½ inch height of cut and fertilized monthly between 0.5 and 3.0 lbs nitrogen per 1000 square feet using a fertilizer composition of the present invention as a solid granular product.

Example 5

A turfgrass for golf green is mown at ⅛ inch or lower and fertilized on a weekly basis, which is termed "spoon feeding," using a fertilizer composition of the present invention as a solid granular product.

Example 6

In another embodiment, the effect of a fertilizer composition of the present invention prepared using the embodiments of this disclosure on soil microbial populations are studied. Nitrogen "dosing" is the equivalent to the standard nitrogen application rate of 1.0 lb of nitrogen/1000 sq. ft.

Example 7

A turfgrass is fertilized on fairways of a golf course using a composition of the present invention in substantially the same manner as described in example 1 at three different rates: half, full and 3× normal rates (0.5, 1.0 and 3.0 lbs nitrogen/1000/month) applied on a monthly basis.

Example 8

In another embodiment the effect of various fertilizers was studied on golf greens. Three 5 feet by 6 feet sized golf greens plots were fertilized with 0.125 lbs nitrogen per 1000 square feet (designated as 1× rate). Fertilizers were applied weekly for 1 month and biweekly after that. The various treatments investigated were: (1) Ammonium Sulphate at 0.5× rate, (2) Ammonium Sulphate at 1× rate, (3) Dry lysine at 0.5× rate, (4) Dry lysine at 1× rate, (5) Liquid lysine at 0.5× rate, (6) Liquid lysine at 1× rate, (7) Soy-Lysine granular at 0.5× rate, (8) Soy-Lysine granular at 1× rate, (9) Sustane 5-2-4 at 0.5× rate, (10) Sustane 5-2-4 at 1× rate and (11) Unfertilized control.

Figure 1:
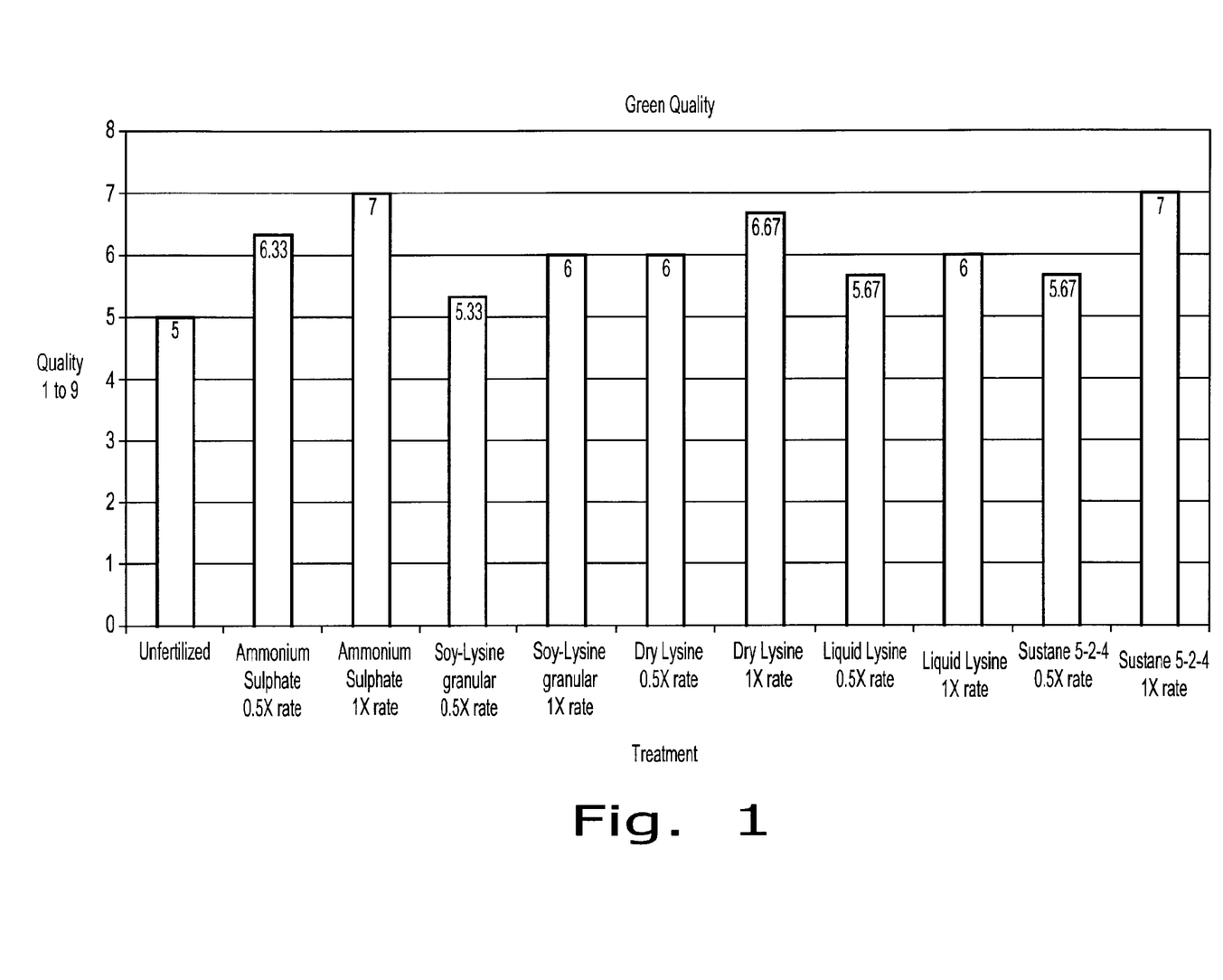
FIG. 1 depicts a quality evaluation of a green height trial of one embodiment of a composition of the present invention compared to other fertilizers. A rating of nine (9) represents the highest quality turf and rating of six (6) or higher are commercially acceptable greens turf.
Figure 2:
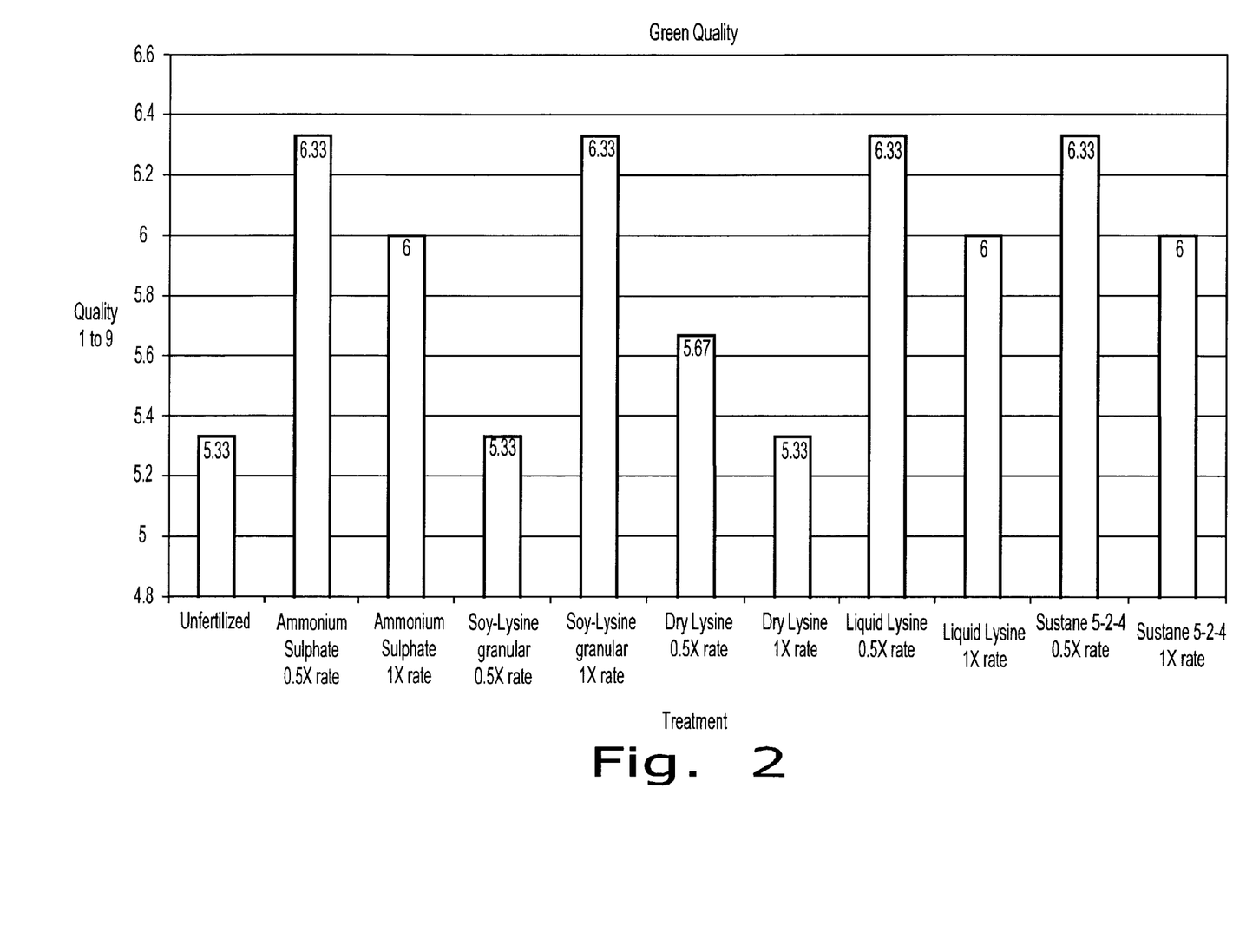
FIG. 2 depicts a quality evaluation of a green height trial of one embodiment of a composition of the present invention compared to other fertilizers. A rating of nine (9) represents the highest quality turf and rating of six (6) or higher are commercially acceptable greens turf.

Sustane and soy-lysine treatments were applied as granular materials. Granular materials were applied on a whole plot basis by adding an appropriate amount of material to a shaker jar and distributing it uniformly across a single plot. All other materials were applied on a liquid basis. All liquids were applied by mixing the appropriate amount of material in approximately 1 gallon of water and distributing it across a single plot by a standard garden watering can. Immediately after application of treatments the entire study was irrigated for approximately 10 minutes to minimize potential injury and activate the fertilizers. The experiments were monitored daily for signs of wilt, injury or past damage, particularly disease. Overall grass was rated weekly using a visual scale of 1-9 with 9 representing perfect greens. Ratings higher than 6.0 are considered acceptable, while any rating below 6.0 is unacceptable. In the Green experiment, no differences were observed after the initial application due to the low application rate. After one month of weekly applications, as presented in FIG. 1 the 1× or normal rate of each material was observed to be of higher quality than the unfertilized plots or the 0.5× rates. However as results presented in FIG. 2 indicate at the 1× application after 11 weeks rate Soy-Lysine granular treatment was comparable to that of Ammonium Sulphate (0.5× rate), Liquid Lysine (0.5× rate) and Sustane (0.5× rate).

Example 9

Figure 3:
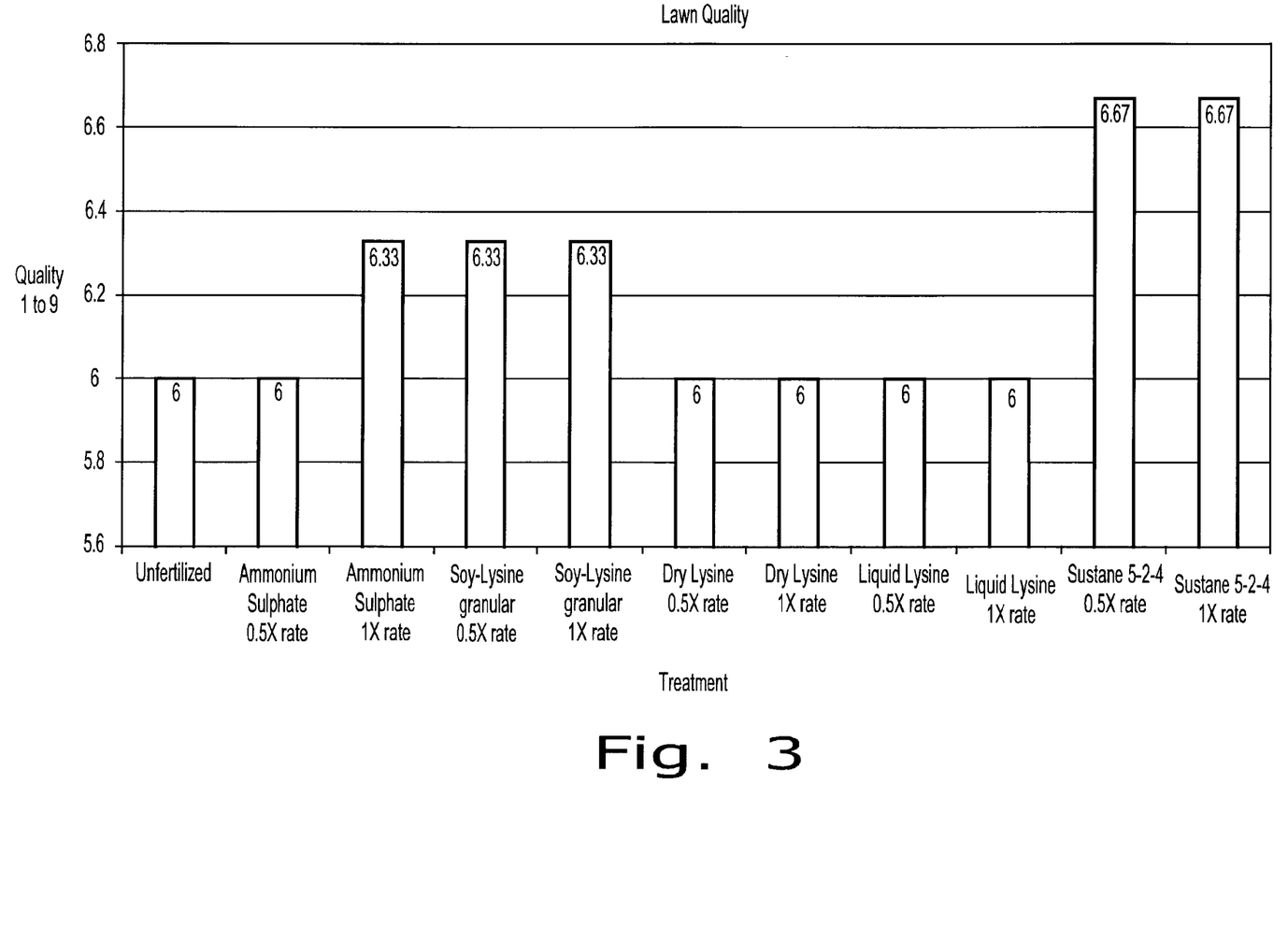
FIG. 3 depicts a quality evaluation of a lawn height trial of one embodiment of a composition of the present invention compared to other fertilizers. A rating of nine (9) represents the highest quality turf and rating of six (6) or higher are commercially acceptable greens turf.
Figure 4:
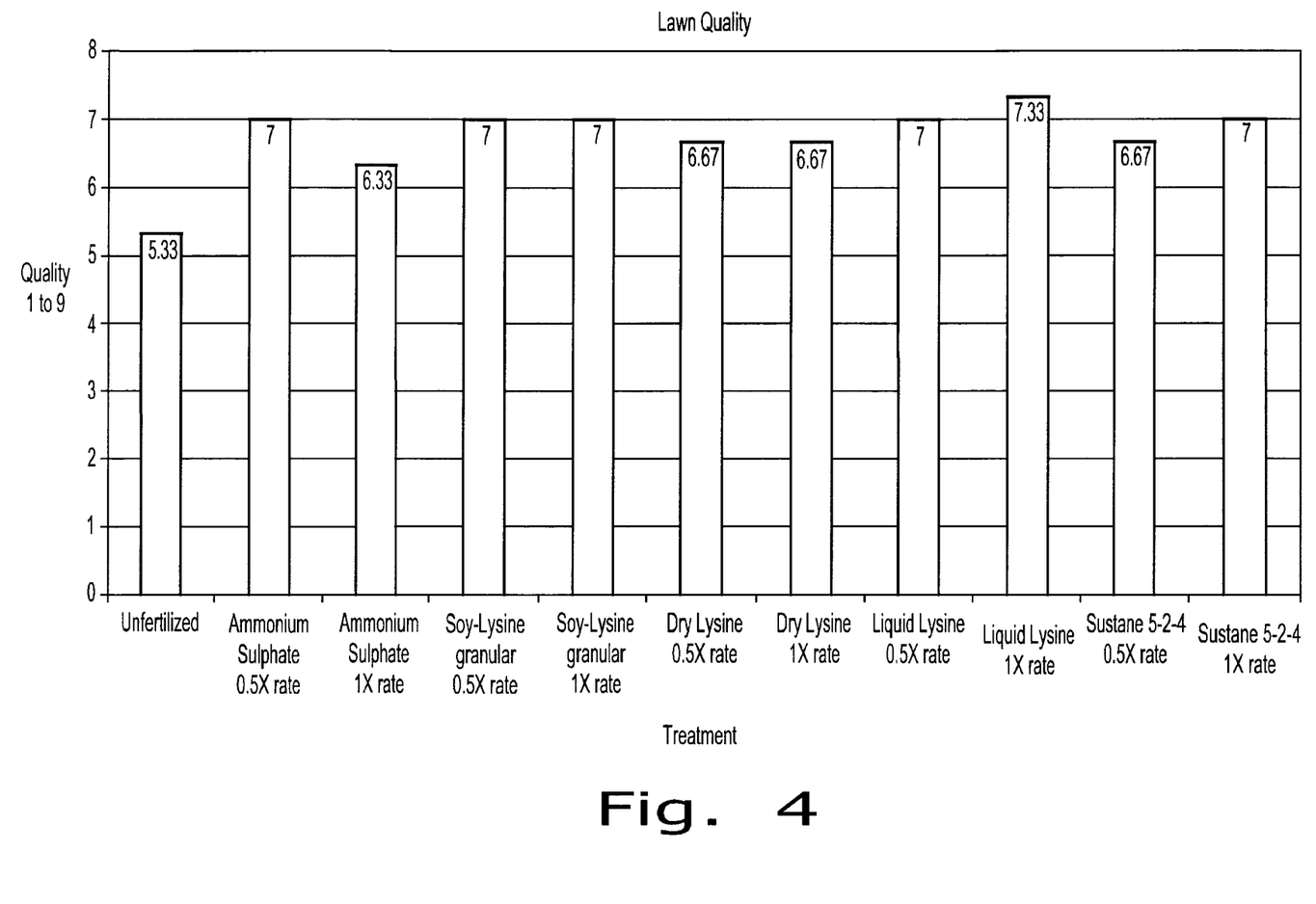
FIG. 4 depicts a quality evaluation of a lawn height trial of one embodiment of a composition of the present invention compared to other fertilizers. A rating of nine (9) represents the highest quality turf and rating of six (6) or higher are commercially acceptable greens turf.

In yet another embodiment the effect of various fertilizers was studied on lawn grass. Three 5 feet by 6 feet sized golf greens plots were fertilized with 0.125 lbs nitrogen per 1000 square feet (designated as 1× rate). Fertilizers were applied weekly for 1 month and biweekly after that. The various treatments investigated were: (1) Ammonium Sulphate at 0.5× rate, (2) Ammonium Sulphate at 1× rate, (3) Dry lysine at 0.5× rate, (4) Dry lysine at 1× rate, (5) Liquid lysine at 0.5× rate, (6) Liquid lysine at 1× rate, (7) Soy-Lysine granular at 0.5× rate, (8) Soy-Lysine granular at 1× rate, (9) Sustane 5-2-4 at 0.5× rate, (10) Sustane 5-2-4 at 1× rate and (11) Unfertilized control. The results are presented in FIGS. 3 and 4.

Sustane and soy-lysine treatments were applied as granular materials. Granular materials were applied on a whole plot basis by adding an appropriate amount of material to a shaker jar and distributing it uniformly across a single plot. All other materials were applied on a liquid basis. All liquids were applied by mixing the appropriate amount of material in approximately 1 gallon of water and distributing it across a single plot by a standard garden watering can. Immediately after application of treatments the entire study was irrigated for approximately 10 minutes to minimize potential injury and activate the fertilizers. The experiments were monitored daily for signs of wilt, injury or past damage, particularly disease. Overall grass was rated weekly using a visual scale of 1-9 with 9 representing lawn grass. Ratings higher than 6.0 are considered acceptable, while any rating below 6.0 is unacceptable.

The overall quality of turf in the lawn height study was very good in the early evaluation (after seven weeks), but showed reduced quality in more recent evaluations. There were no significant differences among treatments, but the Soy-Lysine granular treated plots appeared to catch up in quality with other sources even though they had received only one application (after 11 weeks).

Example 10

In one embodiment the effect of various fertilizers was studied on lawn dollar spot. Three 5 feet by 6 feet sized golf greens plots were fertilized with 0.125 lbs nitrogen per 1000 square feet (designated as 1× rate). Fertilizers were applied weekly for 1 month and biweekly after that. The various treatments investigated were: (1) Ammonium Sulphate at 0.5× rate, (2) Ammonium Sulphate at 1× rate, (3) Dry lysine at 0.5× rate, (4) Dry lysine at 1× rate, (5) Liquid lysine at 0.5× rate, (6) Liquid lysine at 1× rate, (7) Soy-Lysine granular at 0.5× rate, (8) Soy-Lysine granular at 1× rate, (9) Sustane 5-2-4 at 0.5× rate, (10) Sustane 5-2-4 at 1× rate and (11) Unfertilized control.

Figure 5:
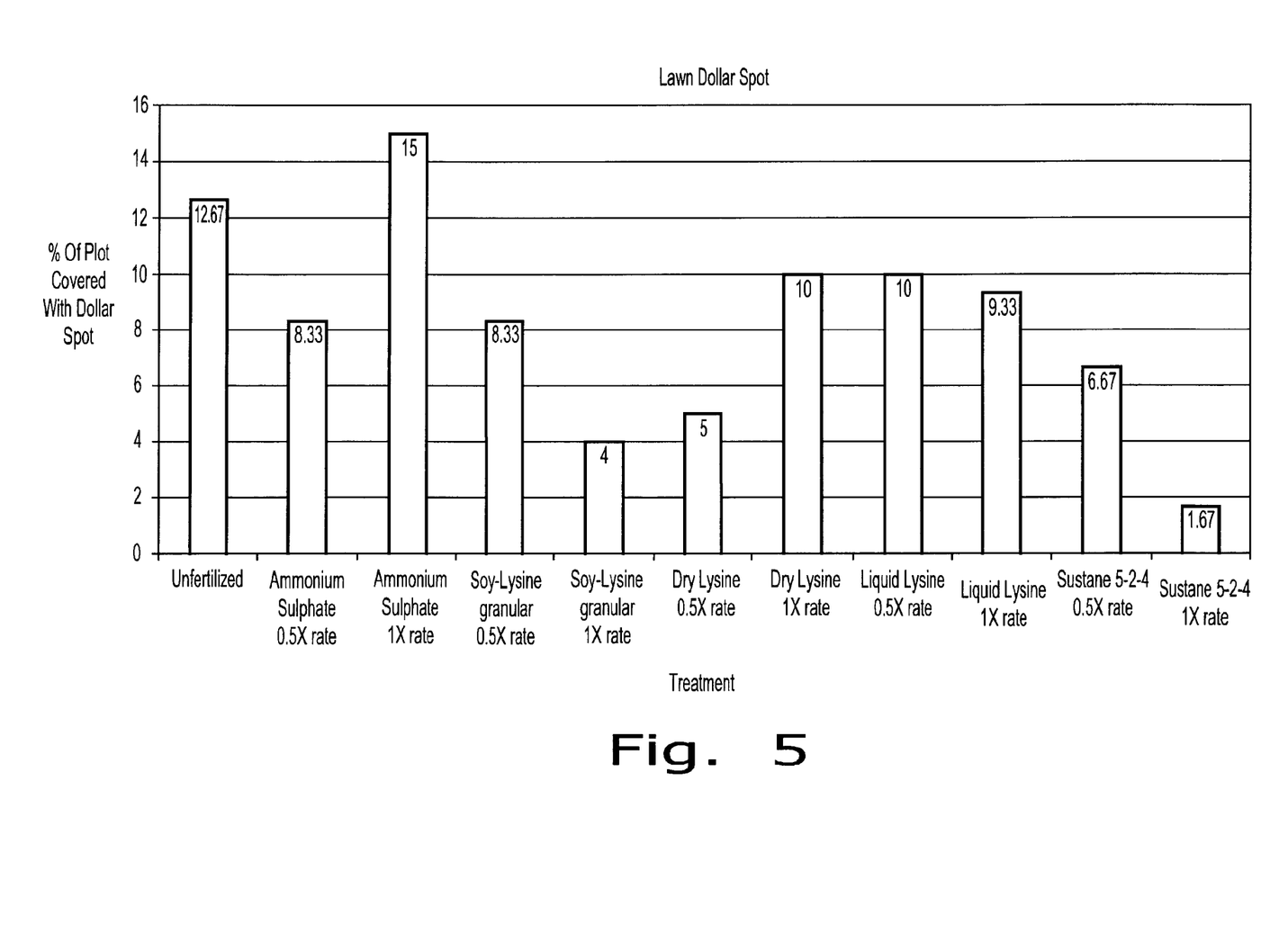
FIG. 5 depicts an evaluation of Dollar Spot infection on a lawn height trial of one embodiment of a composition of the present invention compared to other fertilizers. Ratings are an indication of the percent of plot covered by dollar spot lesions.

Sustane and soy-lysine treatments were applied as granular materials. Granular materials were applied on a whole plot basis by adding an appropriate amount of material to a shaker jar and distributing it uniformly across a single plot. All other materials were applied on a liquid basis. All liquids were applied by mixing the appropriate amount of material in approximately 1 gallon of water and distributing it across a single plot by a standard garden watering can. Immediately after application of treatments the entire study was irrigated for approximately 10 minutes to minimize potential injury and activate the fertilizers. The experiments were monitored daily for signs of wilt, injury or past damage, particularly disease. Percent of plot covered with dollar spot lesions was used to evaluate grass quality ratings. Results are presented in FIG. 5. After 11 weeks of application Soy-Lysine at 1× application and Sustane 5-2-4 at 1× application rate provided the maximum level of dollar spot lesion control.

Example 11

In one embodiment the effect of various fertilizers was studied on lawn crabgrass invasion. Three 5 feet by 6 feet sized golf greens plots were fertilized with 0.125 lbs nitrogen per 1000 square feet (designated as 1× rate). Fertilizers were applied weekly for 1 month and biweekly after that. The various treatments investigated were: (1) Ammonium Sulphate at 0.5× rate, (2) Ammonium Sulphate at 1× rate, (3) Dry lysine at 0.5× rate, (4) Dry lysine at 1× rate, (5) Liquid lysine at 0.5× rate, (6) Liquid lysine at 1× rate, (7) Soy-Lysine granular at 0.5× rate, (8) Soy-Lysine granular at 1× rate, (9) Sustane 5-2-4 at 0.5× rate, (10) Sustane 5-2-4 at 1× rate and (11) Unfertilized control.

Figure 6:
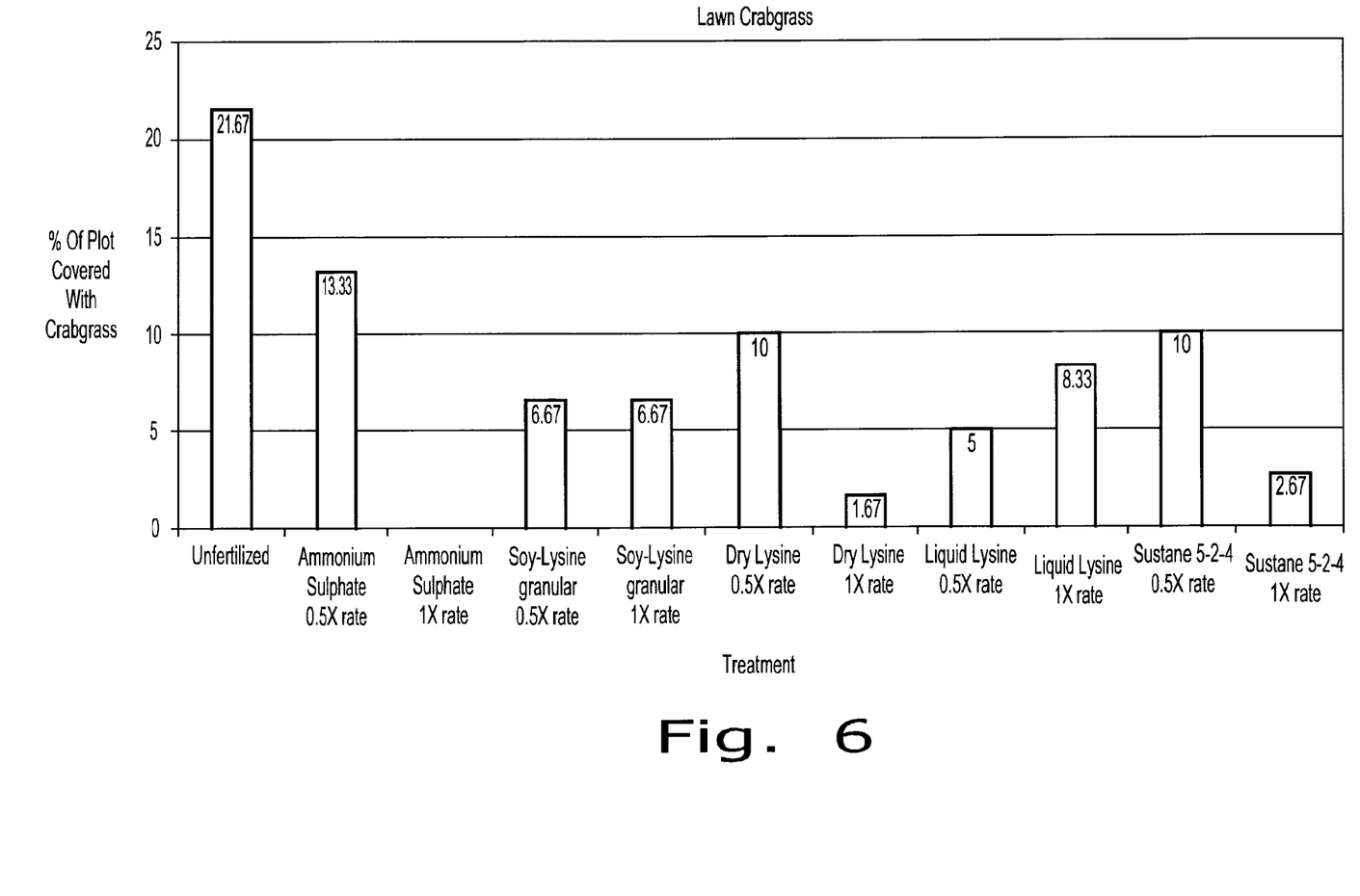
FIG. 6 depicts an evaluation of crabgrass invasion of long height trial of one embodiment of a composition of the present invention compared to other fertilizers. Ratings indicate percentage of plot covered by crabgrass plants.

Sustane and soy-lysine treatments were applied as granular materials. Granular materials were applied on a whole plot basis by adding an appropriate amount of material to a shaker jar and distributing it uniformly across a single plot. All other materials were applied on a liquid basis. All liquids were applied by mixing the appropriate amount of material in approximately 1 gallon of water and distributing it across a single plot by a standard garden watering can. Immediately after application of treatments the entire study was irrigated for approximately 10 minutes to minimize potential injury and activate the fertilizers. The experiments were monitored daily for signs of wilt, injury or past damage, particularly disease. Percent of plot covered with lawn crabgrass was used to evaluate grass quality ratings. Results are presented in FIG. 6. After 11 weeks of application Soy-Lysine at 0.5× application performed better than Sustane 5-2-4 at 0.5× rate or dry lysine at 0.5× rate.

Example 12

In another embodiment, the fertilizers of the various embodiments described herein were compared to industry standards for efficacy and phytotoxicity on St. Augustinegrass and bermudagrass. In another embodiment the experimental fertilizers were evaluated for their efficacy as a pre-emergent herbicide compared to an industry standard.

The treatments for St. Augustine grass and Bermuda grass are outlined in tables 1 and 2 while that for the herbicide treatments are outlined in table 3.

Efficacy of the fertilizers on the St. Augustinegrass Site was evaluated by applying treatments 1-8 to 4 replications of 'Floratam' St. Augustinegrass. Plot size was 1 m×2 m set up as a randomized complete block. Initially Nature Safe was applied as a granular, while ammonium sulfate and remaining products were applied as split liquid treatments sprayed out using a $CO_2$ boom sprayer set to deliver a volume of 1 gallon/1000 ft$^2$. After six weeks all 10 treatments were applied to the 4 replications of 'Floratam'. Products 3-10 were again applied as split liquid treatments using a $CO_2$ boom sprayer. Split treatments were re-applied approximately 2 weeks later. Plots were mowed at 3.0 inches before fertilizer application. Irrigation (0.15 inch) was applied following each application. Clipping samples were taken approximately monthly for dry weight (grams) determination. Plots were rated for turfgrass quality and color (scale of 1-10 where 10=dark green turf, 1=dead/brown turf, and 6=minimally acceptable turf) throughout study period. All data was subject to statistical analysis and significant means were determined.

Efficacy of the fertilizers on the Bermudagrass Site was evaluated by applying, treatments 1-8 to 4 replications of 1 m×2 m bermudagrass plots set up as a randomized complete block. Nature Safe was applied as a granular, while ammonium sulfate and remaining products were applied as split liquid treatments sprayed out using a $CO_2$ boom sprayer set to deliver a volume of 1 gallon/1000 ft$^2$. Turfgrass ratings were taken to ensure turf quality/color uniformity.

After 6 weeks all 10 treatments were applied to 4 replications of bermudagrass plots. Products 3-10 were again applied as split liquid treatments sprayed out using a CO2 boom sprayer. Split treatments were re-applied approximately 2 weeks later. Plots were mowed at 0.5 inches before fertilizer application. Irrigation (0.15 inch) was applied following application. Clipping samples were taken approximately monthly for dry weight (grams) determination. Plots were rated for turfgrass quality and color (scale of 1-10 where 10=dark green turf, 1=dead/brown turf, and 6=minimally acceptable turf) throughout study period. All data was subject to statistical analysis and significant means were determined.

Herbicide efficacy of the fertilizers was evaluated with Granular Lysine (LSG), Liquid Lysine (LSL), and Ronstar G by applying them to 3 replications of 1 m×1 m plots which also included an untreated control. Plots were located in an area of known weed infestation problems. Plots were prepared prior to treatment application by rototilling and applying 3 glyphosate applications to clear up pre-existing weeds and the test was initiated with 0 percent weed in all plots. On approximately monthly intervals percent weed cover ratings were taken. All data was subject to statistical analysis and significant means were determined.

Turfgrass Quality and Color. Significant differences in turfgrass quality and color were observed on all rating dates for St. Augustinegrass sites 1 and 2 (Tables 4-7). The LSG high rate material had the highest numerical average on many rating dates and the NS standard material also performed well on some rating dates (Tables 4-7).

Bermudagrass quality and color were also affected by treatment after application (Tables 8 and 9). As seen with the St. Augustinegrass plots the LSG high rate material generally had the best numerical turfgrass scores on most dates. (Table 8 and 9). A strong response to the second application of fertilizer made all treatments better than the control on the 7/2 rating date regardless of N rate applied and little separation thereafter (Tables 8 and 9).

Clipping weights (obtained from samples after mowing the turfgrasses) were significantly affected by treatment on most harvest dates for both grasses (Tables 10-12). On some dates standards had the most clippings and on other dates experimental materials had greater clipping weights (Tables 10-12).

Weed ratings. A separate test was conducted on bare soil to evaluate weed ratings after application of LSG and LSL compared to a pre-emergence standard and an untreated control. Although there appeared to be a trend was slightly less weeds in the experimental treatments compared to the control, the trends observed were not significantly different (Table 13). The standard had the lowest weed rating on 2 observation dates and by the end of the test all treatments were similar (Table 13).

The methods and compositions described herein are exemplary embodiments and not intended as limitations on the scope of the invention. Other aspects and embodiments will occur to those skilled in the art upon consideration of this specification, and are encompassed within the spirit of the invention as defined by the scope of the claims. It will be apparent to one or ordinary in the art that varying substitutions and modifications may be made to the invention disclosed herein without departing from the scope and spirit of the invention, and from the description of the inventions, including those illustratively set forth herein, it is manifest that various modifications and equivalents can be used to implement the concepts of the present invention without departing from its scope. A person of ordinary skill in the art will recognize that changes can be made in form and detail without departing from the spirit and the scope of the invention. The described embodiments are to be considered in all respects as illustrative and not restrictive. Thus, for example, additional embodiments are within the scope of the invention and within the following claims.

What is claimed:

1. A fertilizer composition comprising:
   50-80% by weight of a seed protein selected from the group consisting of high protein soybean meal, soy protein isolate, soy protein concentrate, soybean flakes, soybean hulls, soybean flour, soybean grits, soybean flakes, whey protein, canola protein, milk protein, gelatin, wheat gluten, cottonseed protein, palm kernels, palm protein, rapeseed kernels, safflower protein, sunflower protein, sesame protein, peanut protein, peanut processing residue, and mixtures of any thereof;
   10-30% by weight of an isolated or purified amino acid product; and
   1-5% by weight of a binding agent;
   wherein the composition comprises at least eight percent by weight nitrogen, at least one percent by weight phosphate, and at least one percent by weight potassium.

2. The fertilizer composition of claim 1, wherein the binding agent is selected from the group consisting of butterfat, cocoa butter, cocoa butter substitutes, illipe fat, kokum butter, milk fat, mowrah fat, phulwara butter, sal fat, shea fat, camelina oil, canola oil, castor oil, coconut oil, coriander oil, corn oil, cottonseed oil, hazelnut oil, hempseed oil, jatropha oil, linseed oil, mango kernel oil, meadowfoam oil, mustard oil, neat's foot oil, olive oil, palm oil, palm kernel oil, peanut oil, rapeseed oil, rice bran oil, safflower oil, sasanqua oil, shea butter, soybean oil, sunflower seed oil, tall oil, tsubaki oil, tung oil, vegetable oils, triacylglycerols, diacylglycerols, monoacylglycerols, triolein palm olein, palm stearin, palm kernel olein, palm kernel stearin, triglycerides of medium chain fatty acids, lecithin, crude glycerin, corn syrup, corn steep liquor, condensed distillers' solubles, derivatives of any thereof, conjugated derivatives of any thereof, genetically-modified derivatives of any thereof, and mixtures of any thereof.

3. The fertilizer composition of claim 1, wherein the isolated or purified amino acid product is selected from the group consisting of lysine monohydrochloride, lysine hydrate, lysine dihydrochloride, lysine sulfate, lysine free-base, lysine cell waste, lysine cell mass, lysine raffinate, a lysine mother liquor, threonine, threonine cell mass, threonine mother liquor, tryptophan, methionine and mixtures of any thereof.

4. The fertilizer composition of claim 1, wherein the composition has a granular form.

5. The fertilizer composition of claim 1, further comprising a soil conditioner.

6. A fertilizer composition comprising:
   soybean meal;
   10-30% by weight of an isolated or purified lysine product;
   soy protein isolate; and
   soybean oil;
   wherein the composition comprises at least eight percent by weight nitrogen, at least one percent by weight phosphate, and at least one percent by weight potassium.

7. The fertilizer composition of claim 6, wherein the soybean meal is present in the composition at 50-80 percent by weight.

8. The fertilizer composition of claim 6, wherein the soy protein isolate is present in the composition at between 5-10 percent by weight.

9. The fertilizer composition of claim 6, wherein the soybean oil is present in the composition at between 1-5 percent by weight.

10. The fertilizer composition of claim 6, wherein the composition is in a granular form.

11. A method comprising:
    spreading a granular form of a composition comprising a seed protein, a binding agent comprising a vegetable oil, and an isolated or purified amino acid product to a plant, soil or a combination thereof;
    wherein the composition comprises at least eight percent by weight nitrogen, at least one percent by weight phosphate, and at least one percent by weight potassium.

12. The method of claim 11, wherein the plant is a turfgrass.

13. The method of claim 12, wherein the turfgrass is selected from the group consisting of St. Augustine grass, Bermuda grass, dwarf Bermuda grass, tall fescue grass, bent grass, buffalo grass, rye grass, and any combinations thereof.

14. The method of claim 11, further comprising mixing the composition with an organic product selected from the group consisting of animal manures, compost, bone meal, feather meal, blood meal, peat, and combinations of any thereof.

15. The method of claim 11, further comprising mixing the composition with a compound selected from the group consisting of a fermentation cell broth, an ammonium salt of an organic acid, an amidated organic carboxylic acid, products and/or by-products generated at an agricultural product processing facility, a chelated mineral and combinations of any thereof.

* * * * *